W. M. FULTON.
FLEXIBLE CONDUIT.
APPLICATION FILED OCT. 27, 1916.

1,409,697.

Patented Mar. 14, 1922.
2 SHEETS—SHEET 1.

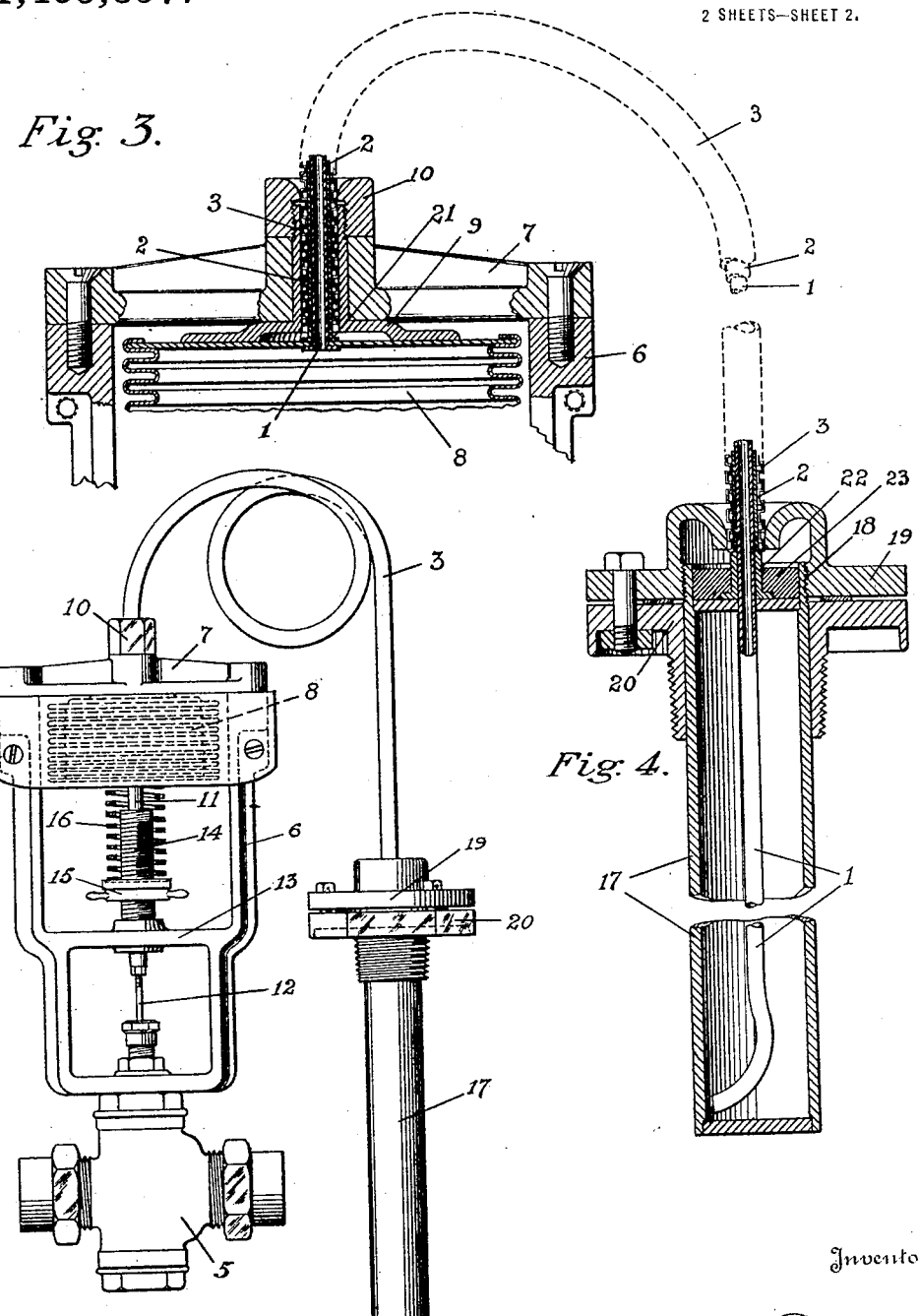

UNITED STATES PATENT OFFICE.

WESTON M. FULTON, OF KNOXVILLE, TENNESSEE, ASSIGNOR TO THE FULTON COMPANY, OF KNOXVILLE, TENNESSEE, A CORPORATION OF MAINE.

FLEXIBLE CONDUIT.

1,409,697.　　　　　　Specification of Letters Patent.　　Patented Mar. 14, 1922.

Application filed October 27, 1916. Serial No. 128,092.

*To all whom it may concern:*

Be it known that I, WESTON M. FULTON, a citizen of the United States of America, and a resident of Knoxville, Tennessee, have invented a new and useful Improvement in Flexible Conduits, which invention is fully set forth in the following specification.

This invention relates to flexible conduits and especially to flexible conduits for use in thermosensitive devices, but said conduit while designed particularly as a flexible connection between the bulb and the extensible and contractible vessel of a thermosensitive device of the type, for example, illustrated in my Patent No. 1,102,035, granted June 30, 1914, has utility in a variety of locations where a flexible conduit is employed.

Various flexible conduits have been devised heretofore, but they have not been of a construction to successfully withstand repeated rough usage. When employed in a thermosensitive device of the type disclosed in my aforesaid patent, the conduit is bent into small compass when it is packed for transportation with the other elements of the device, and is subsequently straightened out and again bent to accommodate the same to the use to which the device is put. Again, whenever the mechanism controlled by the thermosensitive device is to be inspected or repaired, as, for example, when a valve is to be reground, the conduit must be bent out of the way to enable inspection or removal of such mechanism. With tubes heretofore in use, such frequent flexure has resulted in their soon springing a leak, or in their passage becoming constricted by sharp bends, whereby the device was soon rendered inoperative.

An object of this invention is to provide a flexible conduit that may be readily bent into small compass for transportation and again straightened out for use, or which may be readily bent to permit inspection or repair of the mechanism with which it is connected, without danger of breakage. A further object of the invention is to provide a flexible conduit which is so constructed as to insure against its being bent so sharply as to result in a constriction of the passage therethrough. Other objects will appear as the description proceeds.

Stated briefly, the invention comprises a flexible conduit comprising inner and outer seamless metallic tubes, one of said tubes, preferably the outer, being softer than the other, and a flexible armor surrounding said tubes.

One embodiment of the invention is illustrated on the accompanying drawings, but it is to be expressly understood that such embodiment has been selected for purposes of illustration only, and is not to be construed as definitive of the limits of the invention, reference being had to the appended claims for that purpose.

Referring to the drawings, wherein the same reference characters designate corresponding parts throughout, Fig. 1 is an elevation, partly in longitudinal section, of a flexible conduit embodying the present invention;

Fig. 3 is a detailed view illustrating the connection of the flexible conduit of this invention with an extensible and contractible vessel;

Fig. 4 is a detailed view illustrating the connection of the flexible conduit of this invention with a bulb; and Fig. 5 is an elevation of a thermosensitive device employing said flexible conduit.

Figure 1:
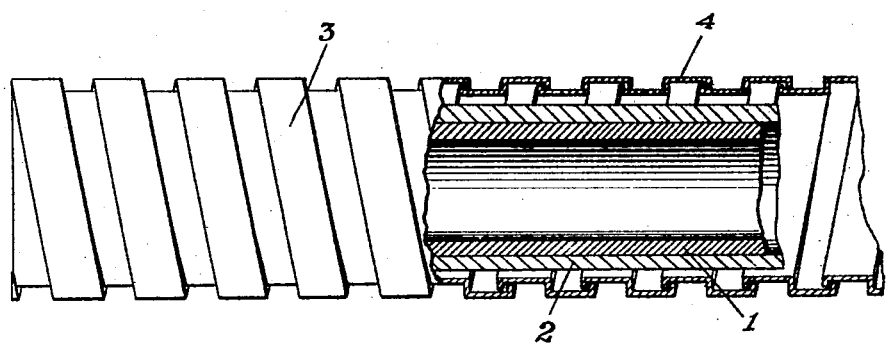
Figure 2:
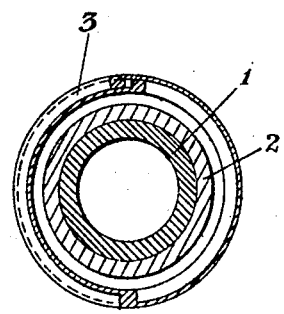
Fig. 2 is a transverse section of the conduit.

Referring in detail to the drawings, the flexible conduit of this invention comprises two seamless metallic tubes 1 and 2, one of said tubes, preferably the outer, being of softer metal than the other. The harder of these tubes may desirably be made of copper or brass, and the softer of these tubes may be made of lead. The tubes are drawn one within the other, and the inner tube by preference closely fits the bore of the outer tube. At one or both ends the tubes may desirably be fused together so that a fluid-tight connection is maintained even though the inner tube leaks.

To prevent tubes 1 and 2 being given too sharp a bend, they are preferably surrounded by a flexible armor 3, which, in the preferred embodiment of the invention, loosely surrounds the outer tube. This flexible armor may be of any suitable construction, the illustrated embodiment comprising spirally corrugated metal tubing composed of a spirally-wound Z-shaped metal strip 4 having interlocking flanges on both edges.

In Figs. 3, 4 and 5, I have shown the flexible conduit of the present invention applied to the use for which it is particularly designed, to wit as a flexible connection between the bulb and extensible and contractible vessel of a thermosensitive device. While the construction shown on the drawings is that of my automatic tank regulator, fully disclosed in my patent above identified, it is to be expressly understood that the invention is not restricted to use in this particular character of thermostat, nor in fact to use in thermosensitive devices, because, while invented especially to solve certain problems existing in the use of flexible conduits in thermosensitive devices, said conduit possesses utility when employed for a variety of other uses.

In said figures, 5 illustrates any conventional means to be controlled, as a valve in a steam or water system. Supported upon the housing of said valve is a frame 6 carrying from its upper detachable end 7 an extensible and contractible vessel 8, of any suitable construction but preferably constructed of corrugated resilient metal, such as brass. One end of said vessel is maintained stationary as by a nipple 9 rigidly secured thereto and passing through an opening in the end 7 of said frame to receive on its upper screw-threaded end a nut 10. The opposite end of said vessel constitutes a movable end wall, and is connected by means of stem 11 with valve stem 12, the stem 11 desirably passing through a guide opening in portion 13 of the frame. Means may be provided for opposing an intial force to the movement of the movable end wall of said vessel, such means preferably being adjustable, and to this end the stem 11 is shown as passing through a tubular screw-threaded member 14 receiving an adjustable nut or collar 15, between which and the movable end wall of the vessel a spring 16 is interposed. 17 designates a bulb designed to be subjected to the source of heat. Bulb 17 is shown with its outer end threaded at 18 for receiving a collar 19, whereby said bulb may be supported in its operative position as by attachment to a screw-threaded sleeve 20 designed to be received within an aperture in the wall of any suitable container.

The flexible conduit of this invention is shown as constituting a flexible intercommunicating connection between the extensible and contractible vessel 8 and the bulb 17. Said conduit may be connected so as to be in communication with the interior of said vessel and bulb in any suitable way, a desirable construction being illustrated on the drawings wherein the inner copper tube 1 is extended through the stationary end wall of said vessel and flanged over and soldered thereto, while the outer lead tube 2 is soldered to a nipple 21 in turn soldered to the outer face of said stationary end wall. The flexible armor 3 extends loosely within the nipple 9, said nipple constituting a reinforcing element for the conduit at its point of connection with the stationary end wall of the vessel. At its opposite end, the inner tube 1 is soldered to the outer end of the bulb 17 and is shown as extended to a point adjacent its inner end, where it may be bent into proximity to the side wall of said bulb. The outer tube 2 is soldered to a nipple 22 retained in position against the end wall of the bulb 17 by a block of solder 23, said nipple 22, together with the collar 19 through which the flexible armor passes loosely, constituting a reinforcing means for said conduit at its point of connection to the bulb. Bulb 17 is charged with any suitable volatile liquid, which liquid may also completely fill the vessel 8 and the flexible conduit intermediate said bulb and vessel.

While the illustrated embodiment has been described with considerable particularity, it is to be expressly understood that the invention is not to be restricted to the form shown on the drawing, as other embodiments will now readily suggest themselves to those skilled in the art. Reference is to be had to the appended claims for a definition of the limits of this invention.

What is claimed is:

1. A flexible conduit comprising inner and outer seamless metallic tubes, one of said tubes being of a softer metal than the other.

2. A flexible conduit comprising inner and outer seamless metallic tubes, the outer of said tubes being of a softer metal than the inner.

3. A flexible conduit comprising inner and outer seamless metallic tubes, one of said tubes being of copper and the other of lead.

4. A flexible conduit comprising inner and outer seamless metallic tubes, the inner of said tubes being of copper and the outer of said tubes being of lead.

5. A flexible conduit comprising inner and outer seamless metallic tubes, one of said tubes being of a softer metal than the other, and a flexible armor surrounding said tubes.

6. A flexible conduit comprising inner and outer seamless metallic tubes, the outer of said tubes being of a softer metal than the inner, and a flexible armor surrounding said tubes.

7. A flexible conduit comprising inner and outer seamless metallic tubes, one of said tubes being of copper and the other of lead, and a flexible armor surrounding said tubes.

8. A flexible conduit comprising inner and outer seamless metallic tubes, the inner of said tubes being of copper and the outer of said tubes being of lead, and a flexible armor surrounding said tubes.

9. A flexible conduit comprising inner and outer closely fitting seamless metallic tubes, one of said tubes being of a softer metal than the other.

10. A flexible conduit comprising inner and outer closely fitting seamless metallic tubes, the outer of said tubes being of a softer metal than the inner.

11. A flexible conduit comprising inner and outer seamless metallic tubes fused together at one or both of their ends, one of said tubes being of a softer metal than the other.

12. A flexible conduit comprising inner and outer seamless metallic tubes, one of said tubes being of a softer metal than the other, and a flexible armor loosely surrounding said tubes.

13. A flexible conduit comprising inner and outer seamless metallic tubes, one of said tubes being of a softer metal than the other, and a flexible armor of spirally corrugated metal surrounding said tubes.

14. A flexible conduit comprising an inner seamless metallic tube, an outer seamless metallic tube of softer metal closely surrounding said inner tube, and a flexible armor loosely surrounding said outer tube.

In testimony whereof I have signed this specification.

WESTON M. FULTON.